(12) United States Patent
Rizzo

(10) Patent No.: US 11,027,408 B2
(45) Date of Patent: Jun. 8, 2021

(54) POWERED TOOL DEVICE

(71) Applicant: Jonathan Rizzo, Davie, FL (US)

(72) Inventor: Jonathan Rizzo, Davie, FL (US)

( * ) Notice: Subject to any disclaimer, the term of this patent is extended or adjusted under 35 U.S.C. 154(b) by 251 days.

(21) Appl. No.: 16/386,520

(22) Filed: Apr. 17, 2019

(65) Prior Publication Data

US 2020/0282541 A1    Sep. 10, 2020

Related U.S. Application Data

(60) Provisional application No. 62/813,345, filed on Mar. 4, 2019.

(51) Int. Cl.
  *B25F 5/02* (2006.01)
  *A01D 34/416* (2006.01)
  *B25F 3/00* (2006.01)

(52) U.S. Cl.
  CPC .............. *B25F 5/02* (2013.01); *A01D 34/416* (2013.01); *B25F 3/00* (2013.01)

(58) Field of Classification Search
  CPC ............. B25F 5/02; B25F 3/00; A01D 34/416
  USPC ........................................................ 173/170
  See application file for complete search history.

(56) References Cited

U.S. PATENT DOCUMENTS

| | | |
|---|---|---|
| 4,182,100 A | 1/1980 | Letter |
| 4,364,435 A | 12/1982 | Tuggle et al. |
| 4,442,659 A | 4/1984 | Enbusk |
| RE32,266 E | 10/1986 | Tuggle et al. |
| 5,265,341 A | 11/1993 | Kikuchi |
| 6,056,668 A | 5/2000 | Nagashima |
| 6,082,087 A | 7/2000 | Tada et al. |
| 6,701,623 B2 | 3/2004 | Sanders |
| 6,880,251 B2 | 4/2005 | Gambert |
| 7,886,509 B2 | 2/2011 | Itoh et al. |
| 7,891,099 B2 | 2/2011 | Wenckel |
| 8,127,455 B2 | 3/2012 | Wenckel et al. |
| 9,049,816 B2 | 6/2015 | Ito et al. |
| D758,150 S | 6/2016 | Tinius |
| 9,918,429 B1 | 3/2018 | Lallo |
| 9,931,746 B2 | 4/2018 | Rader |
| 2010/0031515 A1 | 2/2010 | Hurley |

(Continued)

FOREIGN PATENT DOCUMENTS

EP        0628242 A3    3/1995

OTHER PUBLICATIONS

NPL—Cite No. 1—Proyama 2 handles trimmer on Amazon website available at least as early as April 18, 2019 at: https://www.amazon.com/PROYAMA-Extreme-2-Cycle-Trimmer-Cutter/dp/B07CJWVYJ4.

*Primary Examiner* — Chelsea E Stinson
*Assistant Examiner* — Mary C Hibbert-Copeland
(74) *Attorney, Agent, or Firm* — PatentFile, LLC; Bradley C. Fach; Steven R. Kick

(57) ABSTRACT

A powered tool device may include a first handle grip coupled to a first handle bar and a second handle grip coupled to a second handle bar. A first battery may be coupled to the first handle bar, and a second battery may be coupled to the second handle bar. The two handle bars, handle grips, and their respective batteries may be separated from each other via a separation structure that may separate the two handle bars by a distance which may allow portions of the body of a user to be between the handle bars. Optionally, the separation structure may be moved between an extended position and a compacted position.

14 Claims, 4 Drawing Sheets

(56) References Cited

U.S. PATENT DOCUMENTS

| | | |
|---|---|---|
| 2010/0088902 A1 | 4/2010 | Hurley |
| 2011/0203118 A1* | 8/2011 | Saito ................. A01D 34/78 30/276 |
| 2012/0180445 A1 | 7/2012 | Duller |
| 2014/0013542 A1* | 1/2014 | Wang ................. A01D 34/90 16/429 |
| 2014/0208597 A1 | 7/2014 | Zhou et al. |
| 2018/0102706 A1* | 4/2018 | Gao ..................... H02M 3/02 |
| 2018/0103584 A1 | 4/2018 | Orton |

* cited by examiner

POWERED TOOL DEVICE

CROSS REFERENCE TO RELATED APPLICATIONS

This application claims priority to and the benefit of the filing date of U.S. Provisional Application No. 62/813,345, filed on Mar. 4, 2019, entitled "POWERED TOOL DEVICE", which is hereby incorporated by reference in its entirety.

FIELD OF THE INVENTION

This patent specification relates to the field of powered tool devices. More specifically, this patent specification relates to powered tool devices utilizing battery power.

BACKGROUND

Battery powered tools, such as for lawn and garden purposes, are commonly used. Typically, these tools require a relatively large battery to provide useful power longevity. Unfortunately, current powered tools suffer from a number of problems or drawbacks.

A first problem has to do with insufficient dissipation of heat from within the battery. This is a confounding factor for the advancement of this category of tools because of the relatively large size of batteries required for gardening tasks, the relatively fast and continuous power discharge inherent in the work involved, and the fact that the battery is frequently exposed to direct sunlight. The best solution thus far in the prior art has been to arrange the cells in a single battery pack such that their contact with the surrounding air is maximized. Some tools attempt to solve this problem by changing the shape of the battery, such as by having the cells arranged in a "U" shape. Additionally, some tools utilize phase change material to absorb heat without itself heating up. It is important to note that these are miniscule improvements in heat dissipation.

A second problem has to do with the poor ergonomic design of the standard tools in the marketplace. The majority of the weight of the tool is supported by only one of the user's arms. Additionally, the user is forced to place their arms in positions that put stress on the small arm muscles, neck and back, resulting in premature fatigue and chronic overuse injury, especially as the user walks. The industries' best solution for this problem has been to create battery packs that are designed to be placed onto the user's back in a backpack housing. It is important to note that this solution creates chaffing on the user's shoulders from the straps, and the unit as a whole acts as a body heat insulator on the user's back, disallowing the user's body to naturally dissipate heat to the surrounding environment. Additionally, the hand-held portion of the tool is now front-heavy due to the absence of the battery, requiring the user to press downward on the rear portion of the tool, nullifying the entire purpose of the invention.

Therefore, a need exists for novel powered tool devices. There is also a need for novel powered tool devices utilizing battery power. A further need exists for novel powered tool devices with improved heat dissipation abilities. Finally, a need exists for novel powered tool devices which provide improved ergonomics and user comfort.

BRIEF SUMMARY OF THE INVENTION

A powered tool device is provided which has many advantages over existing devices. For example, the powered tool device allows two or more batteries to be positioned in two locations that may be separated by enough open space that the heat from one battery does not significantly reach the other battery. The additional surface area exposed to the surrounding air increases the rate of heat dissipation significantly, allowing the batteries to run cooler, resulting in fewer heat-related battery failures, resulting in a longer run time per charge, as well as adding years to the battery's overall life. As another example, the powered tool device enables the user's body to remain in the most comfortable and anatomically sound position; generally, the same position as the user of a wheelbarrow. This position is almost identical to what is technically referred to as "the standard anatomical position", except that this wheelbarrow position requires the user's thumbs to be pointed forward, which is an even more neutral and comfortable position for the arms than the standard anatomical position. If the user can remain in this ergonomically sound "wheelbarrow" position (arms at the sides) while doing their work, they will experience much less fatigue and muscle soreness. As a result of this decrease in fatigue, the user may be satisfied with the increase in comfort alone. However, the user will now have the ability to choose to carry more total battery fuel. As a result of this increase in total on-board battery fuel, the user will now have two new options: one, the option of having more tool run time; two, the option of declining the extra run time in favor increased power at the action head, by way of a more powerful motor that draws more current from the larger batteries which will result in increased torque and power at the action head.

In some embodiments, a powered tool device tool device may include a first handle bar and a second handle bar. A first battery housing and a first handle grip may be coupled to the first handle bar, and a second battery housing and a second handle grip may be coupled to the second handle bar. The first and second handle bars may be separated from each other via a separation structure so that when the user grasps the first handle grip with their left hand and the second handle grip with their right hand the body of the user is able to be positioned between the handle bars, and the first battery housing and second battery housing are positioned behind the hands of the user relative to the separation structure.

In further embodiments, a powered tool device may include a first handle bar and a second handle bar. A first battery housing and a first handle grip may be coupled to the first handle bar, and a second battery housing and a second handle grip may be coupled to the second handle bar. The device may also include a motor which may be coupled to a separation structure. The first and second handle bars may be separated from each other via the separation structure so that when the user grasps the first handle grip with their left hand and the second handle grip with their right hand the body of the user is able to be positioned between the handle bars, and the first battery housing and second battery housing are positioned behind the hands of the user relative to the separation structure. The motor may extend away from the separation structure in a direction that is substantially opposite to a direction that the first and second handle bars extend away from the separation structure.

In further embodiments, a separation structure may include a chassis cross member, and a first bar extension and a second bar extension may be coupled to opposing ends of the chassis cross member. The first bar extension may be coupled to the first handle bar, and the first handle grip may be coupled to first handle bar between the first battery housing and the first bar extension. The second bar extension may be coupled to the second handle bar, and the second handle grip may be coupled to second handle bar between the second battery housing and the second bar extension.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Figure 1:
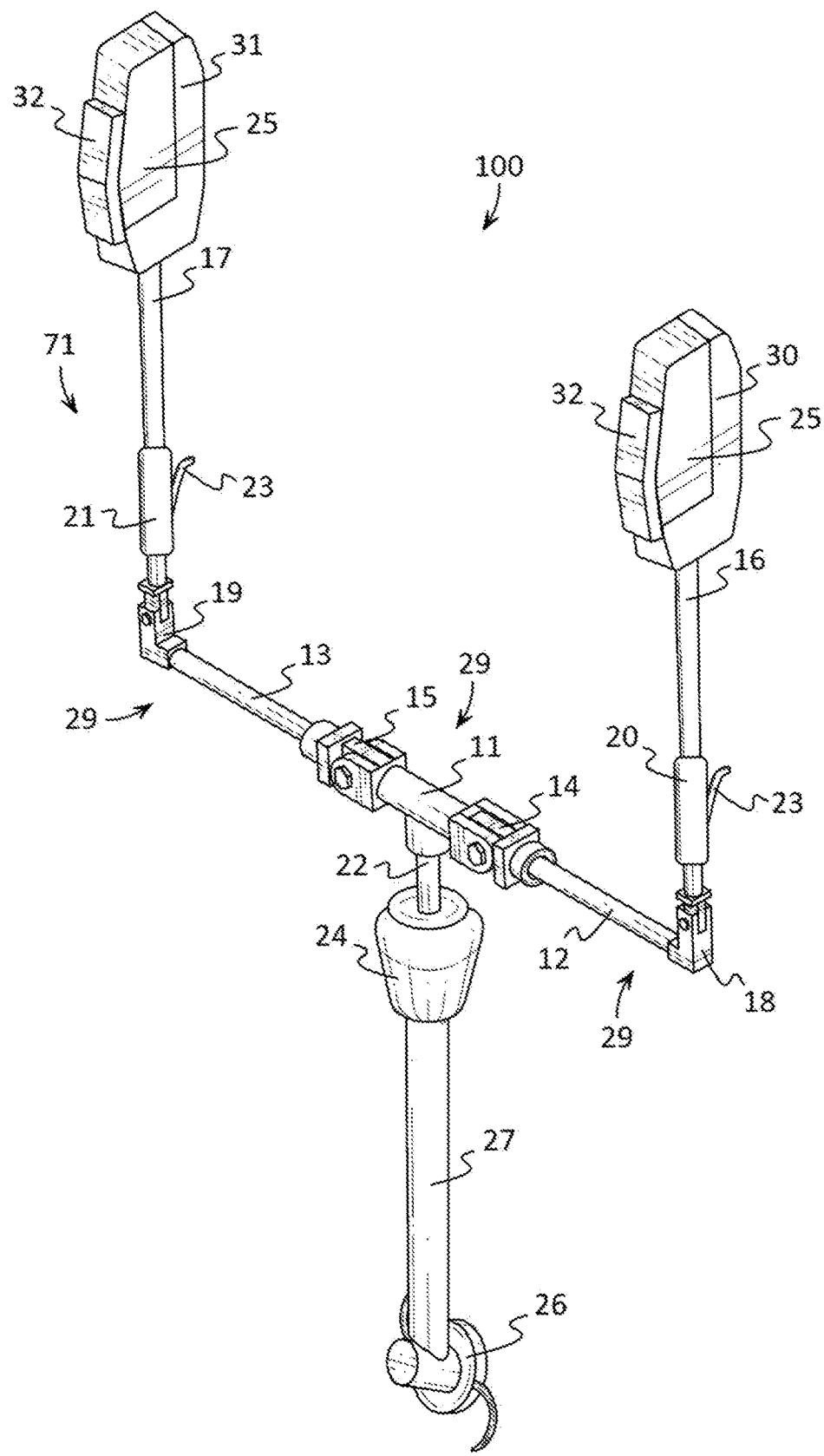
FIG. 1 depicts a perspective view of an example of a powered tool device in an extended position according to various embodiments described herein.
Figure 2:
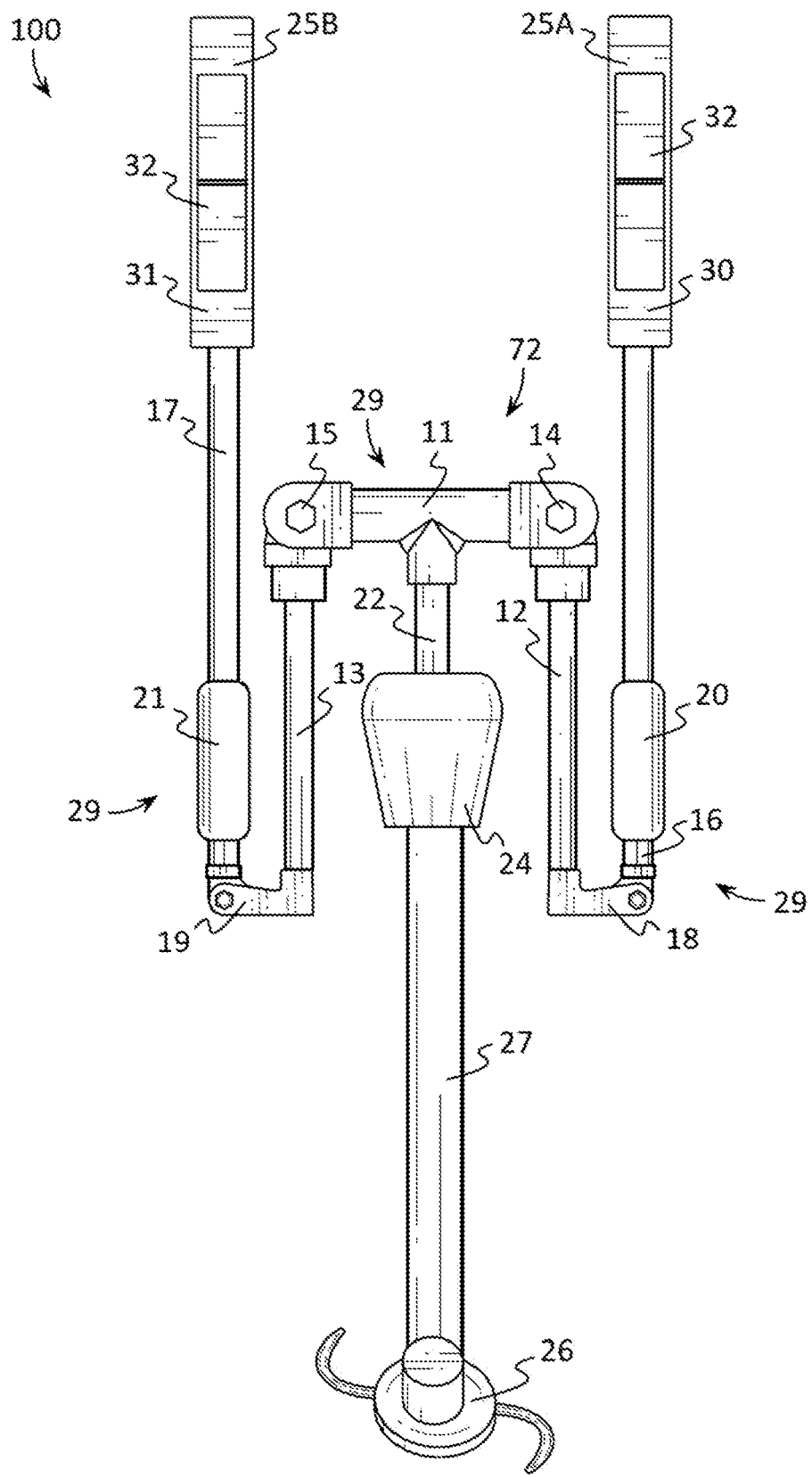
FIG. 2 illustrates a top elevation view of an example of a powered tool device in a compacted position according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts of the invention. Hence, specific dimensions and other physical characteristics relating to the embodiments disclosed herein are not to be considered as limiting, unless expressly stated otherwise.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

A new powered tool device is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

The present invention will now be described by example and through referencing the appended figures representing preferred and alternative embodiments. FIGS. 1-4 illustrate examples of a powered tool device ("the device") 100 according to various embodiments. In some embodiments, the device 100 may comprise a first handle bar 16 and a second handle bar 17. A first battery housing 30 and a first handle grip 20 may be coupled to the first handle bar 16. A second battery housing 31 and a second handle grip 21 may be coupled to the second handle bar 17. The first 16 and second 17 handle bars may be separated from each other via a separation structure 29 so that when a user 200 grasps the first handle grip 20 with their left hand 203 and the second handle grip 21 with their right hand 202 the body 201 of the user 200 may be able to be positioned between the handle bars 16, 17, and the first battery housing 30 and second battery housing 31 may be positioned behind the hands 202, 203, of the user 200 relative to the separation structure 29.

Generally, a separation structure 29 may comprise one or more elements which may be configured to couple the handle bars 16, 17, together and to position the handle bars 16, 17, relative to each other. Additionally, a separation structure 29 may be configured to couple the handle bars 16, 17, to an optional motor 24, optional shaft 27, and optional head 26. In some embodiments, a separation structure 29 may include a chassis cross member 11, bar extensions 12, 13, and/or optionally one or more movable couplings 14, 15, 18, 19. Generally, a chassis cross member 11 may be a centrally-located component of the separation structure 29 that may have the purpose of receiving and anchoring an optional perpendicular action shaft 27 and one or more elements of the separation structure 29 such as the handle bars 16, 17, and optionally one or more movable couplings 14, 15, 18, 19.

In some embodiments, one or more elements of a separation structure 29 may be made from any structural material that may be substantially rigid. For example, a chassis cross member 11, bar extensions 12, 13, and handle bars 16, 17, may be made from or comprise steel alloys, aluminum, aluminum alloys, copper alloys, other types of metal or metal alloys, various types of hard plastics, such as polyethylene (PE), Ultra-high-molecular-weight polyethylene (UHMWPE, UHMW), polypropylene (PP) and polyvinyl chloride (PVC), polycarbonate, nylon, Poly(methyl methacrylate) (PMMA) also known as acrylic, melamine, hard rubbers, fiberglass, carbon fiber, resins, such as epoxy resin, or any other material including combinations of materials that are substantially rigid.

Additionally, a chassis cross member 11, bar extensions 12, 13, and handle bars 16, 17, may be made in any shape and size. For example, a chassis cross member 11, bar extensions 12, 13, and/or handle bars 16, 17, may comprise an elongated cylindrical shape, rectangular prism shape, or any other shape which may allow wires 28 and other components to be routed within and through the chassis cross member 11, bar extensions 12, 13, and/or handle bars 16, 17. In further embodiments, a chassis cross member 11, bar extensions 12, 13, and/or handle bars 16, 17, may be extendable or retractable, such as in a telescoping manner.

In some embodiments, the device 100 may comprise a chassis extension 22 which may be coupled to the chassis cross member 11. Preferably, a chassis extension 22 may be coupled generally perpendicularly to the chassis cross member 11 and may provide a structure to which one or more elements may be coupled to. Similar to a chassis cross member 11, bar extensions 12, 13, and handle bars 16, 17, a chassis extension 22 may be configured in any size and shape and made from any suitable substantially rigid material.

The device 100 may comprise a first handle grip 20, and a second handle grip 21, which may be coupled to the first handle bar 16 and second handle bar 17, respectively. The handle bars 16, 17, and therefore the handle grips 20, 21, may be separated from each other by the chassis cross member 11, bar extensions 12, 13, and couplings 14, 15, 18, 19. In further embodiments, the handle bars 16, 17, and therefore the handle grips 20, 21, may be separated from each other by a distance which allows a person to be positioned between the handle grips 20, 21, such as approximately between 12 to 36 inches although other distances may be used. In preferred embodiments, a first handle grip 20 and a second handle grip 21 may be separated by a grip distance (GD), and the GD may be between 15 and 25 inches. In further preferred embodiments, a first handle bar 16 and a second handle bar 17 may likewise be separated by a distance of between 15 and 25 inches.

In some embodiments, a chassis cross member 11, bar extensions 12, 13, and/or handle bars 16, 17, may be coupled together in a generally non-movable manner. In further embodiments, a chassis cross member 11, bar extensions 12, 13, and/or handle bars 16, 17, may be removably coupled together so that one or more elements may be separated from each other.

In some embodiments, the chassis cross member 11, bar extensions 12, 13, and/or handle bars 16, 17, may be movably coupled together via one or more proximal movable couplings 14, 15, and/or distal movable couplings 18, 19. In preferred embodiments, a handle bar 16, 17, may be movably coupled to the separation structure 29 via a distal movable coupling 18, 19. Optionally, a first bar extension 12 and a second bar extension 13 may be coupled to opposing ends of the chassis cross member 11 via a first 14 and second 15 proximal movable coupling, respectively. The first bar extension 12 may be coupled to a first handle bar 16 via a first distal movable coupling 18, and a first handle grip 20 may be coupled to first handle bar 16 and positioned between the first distal movable coupling 18 and a first battery housing 30 that is also coupled to the first handle bar 16. The second bar extension 13 may be coupled to a second handle bar 17 via a second distal movable coupling 19, and a second handle grip 21 may be coupled to second handle bar 17 and positioned between the second distal movable coupling 19 and a second battery housing 31 that is also coupled to the second handle bar 17.

In some embodiments, the separation structure 29 may comprise one or more proximal movable couplings 14, 15. In preferred embodiments, a bar extension 12, 13, may be movably coupled to the chassis cross member 11 via a proximal movable coupling 14, 15, and/or a handle bar 16, 17, may be movably coupled to a bar extension 12, 13, via a distal movable coupling 18, 19. By having two proximal movable couplings 14, 15, and two distal movable couplings 18, 19, the device 100 may be moved between an extended position 71 and a compacted position 72. Preferably, in the extended position 71, the bar extensions 12, 13, may be generally linearly oriented to each other; the handle bars 16, 17, and handle grips 20, 21, may be oriented generally perpendicularly to the bar extensions 12, 13, and chassis cross member 11; and the handle bars 16, 17, and handle grips 20, 21, may be oriented generally parallel to an optional shaft 27. Preferably, in the compacted position 72, the bar extensions 12, 13, the handle bars 16, 17, and handle grips 20, 21, and an optional shaft 27 may be oriented generally parallel with each other, while the chassis cross member 11 may be oriented generally perpendicularly to the bar extensions 12, 13, the handle bars 16, 17, and handle grips 20, 21, and an optional shaft 27.

In some embodiments, a proximal movable coupling 14, 15, may generally comprise a type of hinge, such as a butt hinge, butterfly hinge, flush hinge, barrel hinge, concealed hinge, continuous hinge, T-hinge, strap hinge, double-acting hinge, Soss hinge, a flexible material hinge, breakaway hinge, or any other type or style of hinge or pivotal joining method that allows portions of a bar extension 12 to be pivoted or otherwise moved towards and away from the cross member 11. In preferred embodiments, a proximal movable coupling 14, 15, may be configured as a locking hinge so that they may lock into place and may be unlocked by a mechanism operated by hand.

In some embodiments, a distal movable coupling 18, 19, may also generally comprise a type of hinge, such as a butt hinge, butterfly hinge, flush hinge, barrel hinge, concealed hinge, continuous hinge, T-hinge, strap hinge, double-acting hinge, Soss hinge, a flexible material hinge, locking hinge, or any other type or style of hinge or pivotal joining method that allows portions of a bar extension 12 to be pivoted or otherwise moved towards and away from the cross member 11. In preferred embodiments, a distal movable coupling 18, 19, may be configured as a breakaway hinge so that they may allow the handle bars 16, 17, to be moved toward the user's body 200 under a set amount of force being applied, rather than being locked into place to prevent the hinges from being accidentally damaged by inward force.

In further preferred embodiments, the device 100 may comprise one or more movable couplings 14, 15, 18, 19, that may be configured to allow a flexible conduit containing electrical wiring 28 to pass through portions of the movable couplings 14, 15, 18, 19, so as to protect the conduit and wiring 28 from damage.

The device 100 may comprise one or more handle grips 20, 21. Preferably, a handle grip 20, 21, may be coupled to each handle bar 16, 17, so that the handle grip 20, 21, may be positioned between a respective battery housing 30, 31 and a respective proximal movable coupling 14, 15, and more preferably positioned closer to the respective proximal movable coupling 14, 15. A handle grip 20, 21, may be configured in any shape and size so that portions of the handle grip 20, 21, may be held or grasped by the user 200 to facilitate the ability of the user 200 to move and position the device 100. In some embodiments, a handle grip 20, 21, may comprise a vibration dampening material that is preferably not electrically conductive, such as silicone foams, rubber foams, urethane foams including plastic foams, neoprene foam, latex foam rubber, polyurethane foam rubber, or elastomer materials such as elastic plastics, elastic silicone, elastic rubbers, or any other suitable elastomer or resilient material. In further embodiments, a handle grip 20, 21, may comprise any other material including combinations of materials that are substantially rigid.

In some embodiments, a handle grip 20, 21, may comprise one or more control inputs 23 that a user 200 may interact with, such as turnable control knobs, throttle triggers, depressible button type switches, slide type switches, rocker type switches, or any other suitable input that may be used to modulate electricity between components or to otherwise control functions of the device 100. In further embodiments, the device 100 may comprise two handle grips 20, 21, and each handle grip 20, 21, may comprise one or more control inputs 23 and one or both control inputs 23 may be used to operate and control an optional motor 24 of the device 100 which would allow the user 200 to use one control input 23, such as via one throttle finger, for half the time and to use the other control input 23, such as via the other throttle finger, for the other half of the time when operating the device 100. In still further embodiments, the device 100 may comprise two handle grips 20, 21, and each handle grip 20, 21, may comprise one or more control inputs 23 and one or both control inputs 23 may be used to operate and control an optional motor 24 of the device 100 which would allow the user 200 to distribute the stress of operating the control inputs 23 equally to both fingers.

Figure 4:
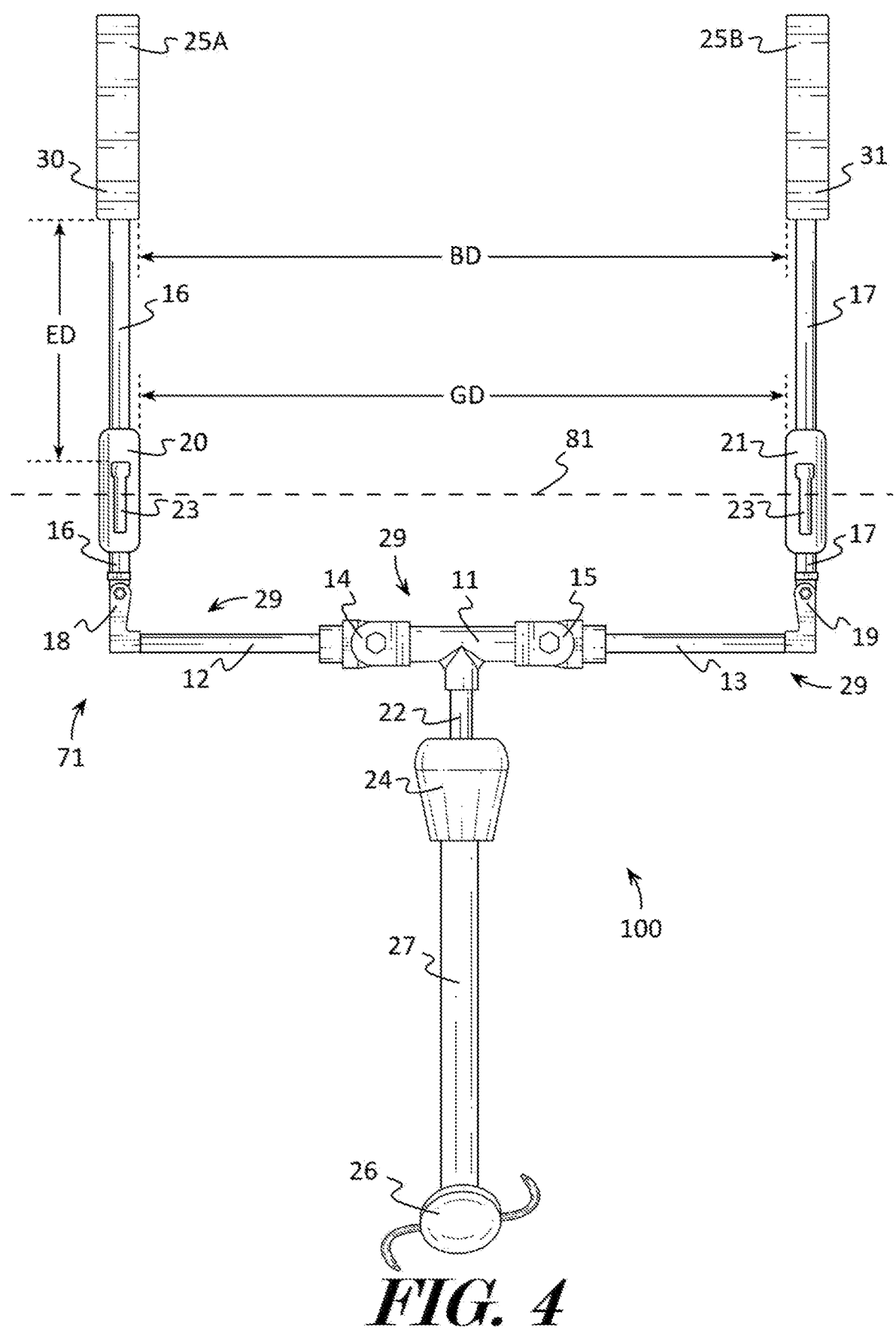
FIG. 4 depicts a bottom elevation view of an example of a powered tool device in an extended position according to various embodiments described herein.

In some embodiments, a first handle grip 20 may comprise a control input 23, and a first battery housing 30 and the control input 23 (the portion of the control input 23 configured to be interacted with by the user 200) of the first handle grip 20 may be separated by an extension distance (ED) as shown in FIG. 4 that may be between 3 and 20 inches, and more preferably between 5 and 15 inches. In further embodiments and likewise, a second handle grip 21 may comprise a control input 23, and a second battery housing 31 and the control input 23 of the second handle grip 21 may be separated by an extension distance (ED) that may be between 3 and 20 inches, and more preferably between 5 and 15 inches. As stated previously, although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

The device 100 may comprise one or more battery housings 30, 31. Generally, a battery housing 30, 31, may comprise a device or structure which may be configured to couple a battery 25A, 25B, to a handle bar 16, 17. In some embodiments, a battery 25A, 25B, may be integrally formed or bonded to a battery housing 30, 31, while in other embodiments a battery 25A, 25B, may be removably coupled to a battery housing 30, 31. A battery housing 30, 31, may be made from or comprise any material that is substantially rigid for coupling and supporting a battery 25A, 25B, to a handle bar 16, 17. In further embodiments, a first battery housing 30 may be coupled to a first handle bar 16 so that the first battery housing 30 may be positioned distally to the junction between the first handle bar 16 and separation structure 29, such as a first distal movable coupling 18. Likewise, a second battery housing 31 may be coupled to a second handle bar 17 so that the second battery housing 31 may be positioned distally to the junction between the second handle bar 17 and separation structure 29, such as a second distal movable coupling 19. In preferred embodiments, the first battery housing 30 and the second battery housing 31 may be separated by a battery distance (BD), and the BD may be between 12 and 30 inches, and more preferably between 15 and 25 inches.

In some embodiments, the device 100 may comprise one or more batteries 25, such as a first battery 25A and a second battery 25B. In preferred embodiments, a first battery 25A may be coupled to a first battery housing 30 and a second battery 25B may be coupled to a second battery housing 31. Preferably, the batteries 25A, 25B, may be removably coupled to their respective housings 30, 31, via a release 32, such as a depressible button or movably lever, which may be operated to uncouple a battery 25A, 25B, from a housing 30, 31. A battery 25A, 25B, may be coupled anywhere to a battery housing 30, 31. In some embodiments, a battery 25A, 25B, may be coupled to the upper portions of a battery housing 30, 31, so as to enter or otherwise engage the housing 30, 31, from above.

A battery 25 may comprise any type of power source, such as a lithium ion battery, nickel cadmium battery, alkaline battery, or any other suitable type of battery, a fuel cell, a capacitor, a super capacitor, or any other type of energy storing and/or electricity releasing device. By coupling a battery 25 to a battery housing 30, 31, that is positioned behind and away from each handle grip 20, 21, the batteries 25 may be coupled to the distal end of their respective handle bar 16, 17. In preferred embodiments, the device 100 may comprise a first 25A and second 25B battery, and the batteries 25A, 25B, may be configured to operate or discharge at different times. In this manner, using just one battery 25A, 25B, at a time will not decrease the power output, it will only decrease the run time of the power, so that by discharging the batteries 25A, 25B, separately the user 200 may benefit from the advantage of the finger-saving benefits of such a design. In alternative embodiments, the device 100 may comprise a first 25A and a second 25B battery which may be discharged via a single control input 23, and the batteries 25A, 25B, may be coupled together in series. In further embodiments, two or more batteries 25 may be coupled together in series, in parallel, or in any other configuration.

In some embodiments, the device 100 may comprise one or more motors 24 that may be coupled anywhere on the device 100, such as to the separation structure 29 optionally via a chassis extension 22. In preferred embodiments, a motor 24 may be coupled to the separation structure 29 so that the motor 24 may be substantially equidistant to the first 16 and second 17 handle bars. In further preferred embodiments, a motor 24 may be coupled to the separation structure 29 so that the motor 24 extends away from the separation structure 29 in a direction that is substantially opposite to a direction that the first 16 and second 17 handle bars extend away from the separation structure 29 when the device 100 is in the extended position 71 as perhaps best shown in FIGS. 1, 3, and 4.

Generally, a motor 24 may be in electrical communication with one or more batteries 25 and control inputs 23 via wiring 28 or other suitable electrical connection method. A motor 24 may be operably connected to a head 26 so that the motion of the motor 24 allow the head to operate and perform functions.

In some embodiments and optionally, the device may include a head 26 and motor 24 that may be structurally coupled together by an optional shaft 27 which may include a drive shaft or other operable connection method that may be used to transfer mechanical energy from the motor 24 to the head 26. In preferred embodiments, a head 26 may be removably coupled to the shaft 27 or other element of the device 100 so that the head 26 may be changed and replaced. In some embodiments, a head 26 may comprise a string trimmer type head, a grass edger type head, a brush cutter type head, a tiller type head, a blower type head, a sweeper type head, a mixing type head, a scythe type head, and any other type of mechanical work head such as which may be used for lawn and garden tasks or any other task in any other industry.

In some embodiments, a motor 24 may comprise a brushed DC motor, brushless DC motor, switched reluctance motor, universal motor, AC polyphase squirrel-cage or wound-rotor induction motor, AC SCIM split-phase capacitor-start motor, AC SCIM split-phase capacitor-run motor, AC SCIM split-phase auxiliary start winding motor, AC induction shaded-pole motor, wound-rotor synchronous motor, hysteresis motor, synchronous reluctance motor, pancake or axial rotor motor, stepper motor, or any other type of electrically operated motor. In other embodiments, a motor 24 may comprise or include any other type of motor.

Figure 3:
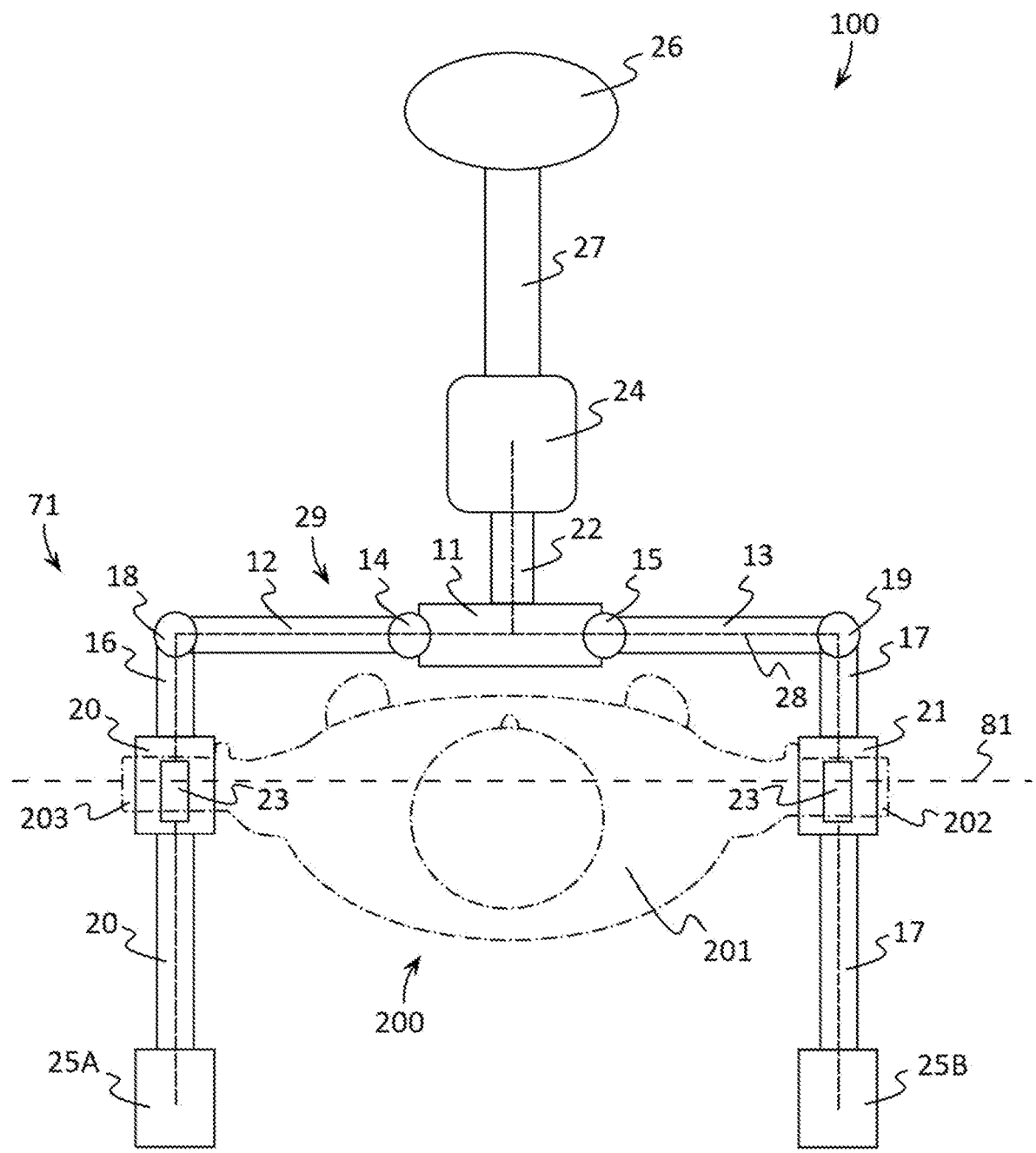
FIG. 3 shows a block diagram of an example of a powered tool device according to various embodiments described herein.

As perhaps best shown in FIGS. 3 and 4, in preferred embodiments, the device 100 may comprise two handle bars 16, 17, two handle grips 20, 21, and a battery 25A, 25B, may be coupled to each handle bar 16, 17. When the device 100 is in the extended position 71, the handle grips 20, 21, handle bars 16, 17, and their respective batteries 25 may be positioned on a side of the separation structure 29 that is generally opposite to the side that an optional motor 24, shaft 27, and head 26 may be coupled to. The elements 16, 17, 20, 21, 25A, 25B, 26, 27, 29 may be coupled together and positioned so that the device 100 may comprise a center of balance 81 which may extend through the handle grips 20, 21, and more preferably through or proximate to a control input 23 of one or both handle grips 20, 21. In this manner, when a user 200 is holding the device 100 by the handle grips 20, 21, and operating the device 100 via a control input 23 of one or both handle grips 20, 21, all or portions of the weight of the handle bars 16, 17, handle grips 20, 21, and batteries 25 may offset all or portions of the weight of the separation structure 29, motor 24, shaft 27, and head 26. Preferably, a user 200 may position their body between the handle bars 16, 17, and/or handle grips 20, 21, so that all or portions of the batteries 25 may be positioned posterior to the user's body 200 a desired distance that they provide sufficient counterweight and result in a properly balanced tool device 100. In further preferred embodiments, the chassis cross member 11 or chassis extension 22 may provide an anchor point for a harness that may be worn by the user 200 to support the weight of the device 100 while the positioning of the handle bars 16, 17, handle grips 20, 21, and batteries 25 on opposite sides of the user 200 may serve to balance the device 100 to reduce or eliminate the amount of effort put forth by the user 200 to balance the device 100.

While some exemplary shapes and sizes have been provided for elements of the device 100, it should be understood to one of ordinary skill in the art that any element described herein may be configured in a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention.

Additionally, while some materials have been provided, in other embodiments, the elements that comprise the device 100 may be made from or may comprise durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or comprise durable and slightly flexible materials such as soft plastics, silicone, soft rubbers, or any other suitable materials including combinations of materials. In some embodiments, one or more of the elements that comprise the device 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the device 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, a slide-to-lock type connection method or any other suitable temporary connection method as one reasonably skilled in the art could envision to serve the same function. In further embodiments, one or more of the elements that comprise the device 100 may be coupled by being one of connected to and integrally formed with another element of the device 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A powered tool device configured for use by a user having a body, a first hand, and a second hand, the device comprising:
   a shaft configured to couple with an action head and a motor;
   a separation structure coupled to the shaft, the separation structure oriented perpendicular to the shaft;

a first handle bar having a first medial end and a first distal end, the first medial end coupled to the separation structure and the first handle bar oriented to extend perpendicular to the separation structure;

a first battery housing coupled to the first handle bar at the first distal end;

a second handle bar having a second medial end and a second distal end, the second medial end coupled to the separation structure and the second handle bar oriented to extend perpendicular to the separation structure so that the first handle bar and the second handle bar are oriented parallel to each other;

a second battery housing coupled to the second handle bar at the second distal end;

wherein the first and the second handle bars are separated from each other via the separation structure so that when the user grasps the first handle bar with their first hand and the second handle bar with their second hand the body of the user is able to be positioned between the first and the second handle bars.

2. The device of claim 1, wherein the first handle bar comprises a control input, wherein the first battery housing and the control input are separated by an extension distance (ED), and wherein ED is between 5 and 15 inches.

3. The device of claim 1, wherein the first handle bar and the second handle bar are separated by a grip distance (GD), and wherein GD is between 15 and 25 inches.

4. The device of claim 1, wherein the first battery housing and the second battery housing are separated by a battery distance (BD), and wherein BD is between 15 and 25 inches.

5. The device of claim 1, wherein the action head is operably coupled to the motor.

6. The device of claim 1, wherein the motor extends away from the separation structure in a direction that is substantially opposite to a direction that the first and second handle bars extend away from the separation structure.

7. The device of claim 1, further comprising a center of balance, wherein the center of balance extends between a first handle grip and a second handle grip.

8. The device of claim 1, wherein the first handle bar is movably coupled to the separation structure.

9. The device of claim 1, wherein the separation structure comprises a locking hinge.

10. The device of claim 1 further comprising a first battery connected to the first battery housing and a second battery connected to the second battery housing so that a weight from the first battery and the second battery is provided as a counterweight to the shaft when the shaft is coupled to the motor and a user is standing between both the first and the second handle bars and holding the device.

11. The device of claim 10, wherein the first battery and the second battery are electronically coupled together in series.

12. The device of claim 10, wherein the first battery and the second battery are electronically coupled together in parallel.

13. The device of claim 10, further comprising a throttle, the throttle positioned on at least one of; the first handle bar and the second handle bar.

14. The device of claim 1, wherein the shaft terminates at a cross member coupled to the separation structure thereby creating an open area that is free from the shaft and allowing the body of the user to stand equidistantly between the first and the second handle bars.

* * * * *